(12) United States Patent
Crawford

(10) Patent No.: US 8,225,748 B2
(45) Date of Patent: Jul. 24, 2012

(54) POTTY POLE

(76) Inventor: Robert Jordy Crawford, Prairieville, LA (US)

( * ) Notice: Subject to any disclaimer, the term of this patent is extended or adjusted under 35 U.S.C. 154(b) by 578 days.

(21) Appl. No.: 12/001,977

(22) Filed: Dec. 14, 2007

(65) Prior Publication Data

US 2009/0151646 A1 Jun. 18, 2009

(51) Int. Cl.
*A01K 29/00* (2006.01)
(52) U.S. Cl. ........................ 119/161; 119/169
(58) Field of Classification Search .......... 119/161–172, 119/705, 706, 711; 222/143, 174; 221/67, 221/68; D30/161
See application file for complete search history.

(56) References Cited

U.S. PATENT DOCUMENTS

| | | | | | |
|---|---|---|---|---|---|
| 2,230,861 | A | * | 2/1941 | Buehler | 119/161 |
| 3,752,121 | A | * | 8/1973 | Brazzell | 119/169 |
| 4,159,772 | A | * | 7/1979 | Beck | 206/233 |
| 5,085,174 | A | * | 2/1992 | Etkin | 119/169 |
| 5,183,157 | A | * | 2/1993 | Darden | 206/390 |
| 6,145,245 | A | * | 11/2000 | Honkawa et al. | 47/41.01 |
| 7,249,570 | B1 | * | 7/2007 | Roberson | 119/169 |
| 2005/0263096 | A1 | * | 12/2005 | Mita et al. | 119/706 |
| 2006/0191488 | A1 | * | 8/2006 | Ricchiuti | 119/161 |

FOREIGN PATENT DOCUMENTS

| | | | | |
|---|---|---|---|---|
| JP | 2003061499 | A | * | 3/2003 |
| JP | 2006166795 | A | * | 6/2006 |
| JP | 2007275041 | A | * | 10/2007 |
| JP | 2007312713 | A | * | 12/2007 |

* cited by examiner

*Primary Examiner* — Kimberly Berona
*Assistant Examiner* — Danielle Clerkley

(57) ABSTRACT

This invention is to be used primarily in the reception and disposal of urination from animals within a set area. It is comprised of a base tray, a vertical, hollow cylinder and absorbent pads designed and crafted to securely cover the exterior of the cylinder and tray. The absorbent pads are contained within the hollow cylinder and removed through an opening at the top of the cylinder. The vertical aspect of the invention attracts animals to urinate as per their instinct similar to an animal urinating on a bush or fire hydrant. The soiled absorbent pad is removed and another clean pad will take its place after being removed from the interior of the cylinder through the top opening in the cylinder.

2 Claims, 7 Drawing Sheets

POTTY POLE

CROSS REFERENCES TO RELATED APPLICATIONS

| U.S. Patent Documents | | | |
|---|---|---|---|
| 1,773,141 | August, 1930 | Hodgson | 119/165 |
| 3,752,121 | August, 1973 | Brazzell | 119/169 |
| 6,079,363 | June, 2000 | MacLaine | 119/161 |
| D307201 | April, 1990 | Gold | D30/161 |
| 2006/0191488 | August, 2006 | Ricchiuti | 119/161 |

STATEMENT REGARDING FEDERALLY SPONSORED RESEARCH AND DEVELOPMENT

Not Applicable

REFERENCE TO A "SEQUENTIAL LISTING," A TABLE, OR COMPUTER PROGRAM LISTING APPENDIX SUBMITTED ON A COMPACT DISC

Not Applicable

BACKGROUND OF THE INVENTION (1) Technical Field of Invention

The general purpose of this invention is to provide or facilitate a means by and through which a dog may urinated inside the home in a sanitary and easily disposed of manner.

(2) Description of Prior Art

Throughout the years there have been numerous patented inventions that utilize some sort of base tray coupled with an upright member to attract and hopefully induce urination by a dog in a certain location. While many of these inventions are useful and functional, they are not always practical and have similar shortcomings in sanitation and ease of clean up and disposal.

These inventions consist of faux fire-hydrants, fake grass, grids allowing urine to flow downward into a grid, etc. The common link between the inventions typically revolves around the notion that dogs, especially male dogs, are attracted to upright objects and/or grass or rough terrain in relieving themselves as they also "mark" their respective territory. The invention that is the subject of this application similarly relies on this common thread of logic yet expends upon the means by and through which the animal is attracted to the area as well as sanitary and easy disposal of the urine after use.

BRIEF SUMMARY OF THE INVENTION

The present invention is an apparatus that consists of multiple components, including but not limited to, a solid base tray, a hollow, upright cylinder, an attachment means between the base tray and the cylinder, and absorbent pads that are designed to fit securely or closely to the exterior of the cylinder.

The upright cylinder is hollow and has holes or openings on its top and bottom portions. The absorbent pads are placed within the interior of the cylinder from the bottom opening and are removed through the top opening. The preferred embodiment of the base tray is to have a vertical lip around its peripheral edge to prevent leakage of urine or other contents.

When the pads are placed within the cylinder, the cylinder will be secured to the base tray by an appropriate securing means. There are multiple means of securing the cylinder to the tray. One such method uses interlocking, corresponding tabs that twist into place upon on another about an axis of rotation. Another method would be securing the cylinder to the base tray by use of corresponding threads or a nut and bolt securing means. Emphasis in the securing means should be consistent with a means that provides a stable, and secure connection that is or essentially is water/urine proof to prevent soiling of the pads remaining within the cylinder. Furthermore, the securing means should provide for ease of use, yet be sturdy enough to prevent the animal from dislodging cylinder from the base tray. The cylinder and base tray can also be crafted as a single unit that cannot be separated.

One of the truly novel aspects of the inventions relates to the pads and how they correspond to the cylinder. As noted above, the pads are placed through the bottom opening or hole in the cylinder and removed through the top opening or hole in said cylinder. Typically, multiple pads stacked one on top of the other will be placed within the cylinder and pushed or located to correspond the respective center of the pad with the center of the top opening of the cylinder. After the cylinder is secured by the appropriate means to the base tray, the user will remove one pad at a time through the top-opening and drape it over the exterior of the cylinder. The pads can be impregnated with a scent to attract animals to the area and entice urination. The can also be impregnated with a pleasant scent to combat the smells of urine or feces deposited by the animal.

The cylinder itself can, although it is not limited, be tapered from the bottom to the top, gradually getting smaller in diameter as the cylinder goes up from its base. This shape functions to hold the remaining pads within the cylinder while a single pad is removed. The action is similar to that of removing a piece of tissue paper from a tissue box. A flexible plastic, or like material, cap piece may be placed over the top opening of the cylinder with a slit running from one end to the other through which the pads will be pulled by the user. This cap piece further secures the remaining pads within the cylinder not be used as well as places a barrier between the outside of the cylinder and the interior of the cylinder containing the unused pads. This too will aid in prevention of the pads being prematurely soiled by the animal.

The pads themselves are contoured to the exact dimensions of the cylinder and corresponding base tray so as to fit securely over the cylinder itself. The animal will be attracted to the invention as it would be attracted to any upright object for urination. Attraction will also be added by scents added to the pads as mention above. The pad placed over the cylinder absorbs the urine deposited by the animal. The pad can be crafted to many specifications, including covering simply the cylinder, the cylinder and a portion of the base tray near the bottom of the cylinder, or the entirety of the cylinder and base tray. The preferred embodiment would be to cover at least a portion of the base tray as well as the entirety of the upright cylinder.

Once the pad has received the requisite amount of use by the animal, which will be decided by the user, the soiled pad is removed and a new pad is removed from within the cylinder from the top opening and placed over the cylinder. The process will be repeated until such time as the pads need replacing within the cylinder. At this time, the user will remove the cylinder from the base tray by manipulating the securing means and insert new pads into the cylinder. The cylinder will then be reattached to the base tray and the process begins anew.

The base tray and cylinder can be crafted to meet various specifications and are not limited in size or scope. The base tray can be rectangular, square or circular in shape. The height of the cylinder is not limited. The preferred embodiment in the material from which the invention will be comprised is a material that is light and sturdy, such as plastic or even aluminum or another alloy. The benefit of plastic is ease of manufacture, while the benefit of aluminum, or like substances, is that the animal cannot destroy the components of the invention as easily by chewing or scratching. Other materials are also suitable for construction, however, it is preferred that the material be non-absorbent in the unlikely event that the urine passes through the absorbent pads.

As mentioned above, the cylinder and tray can be constructed as a solid unit in which there is no detachment from one another. In this embodiment, a access hole or opening into which the pads will be inserted within the upright cylinder will be in the underside of the tray. The manner of use aside from detachment and re-attachment of the cylinder to the base tray is the same.

The novel aspects of the invention include the contoured absorbent pads made to utilize with the invention, the novel method of storage and use within the invention as well as the actual use of the pads coupled with the attractive nature of the invention with reference to animals, especially dogs.

DETAILED DESCRIPTION OF THE INVENTION

Figure 1:
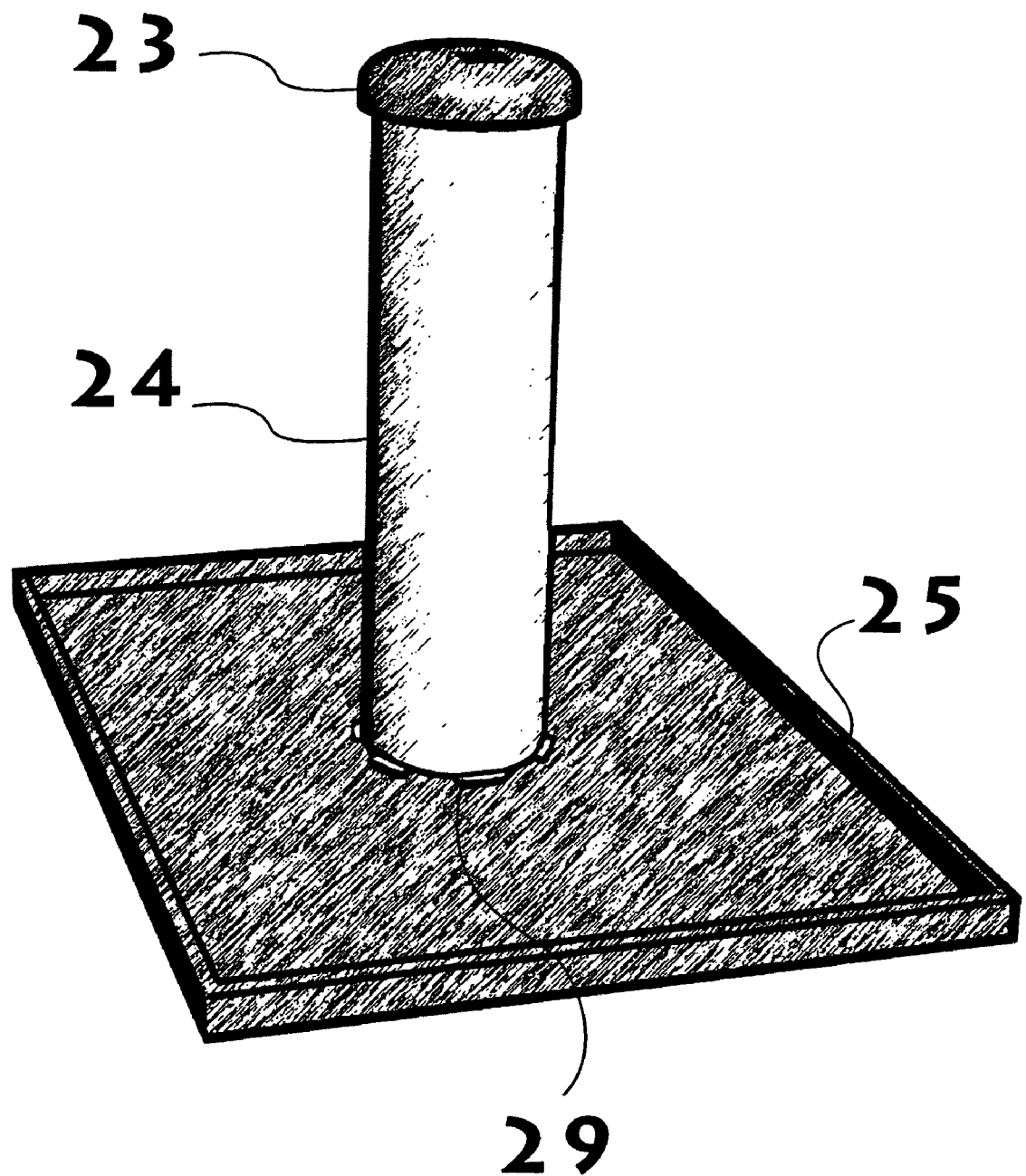
FIG. 1. illustrates the invention without the absorbent pad draped over its exterior.

Referring to FIG. 1 through FIG. 7, the invention in comprised primarily of a solid base tray (22), a hollow, upright or vertical cylinder (24), absorbent pads (26) that are contoured to securely and closely fit the exterior of the cylinder (24) and rest on top of the base tray (22). The pads (26) can be stored within the interior of the cylinder (24) removed therefrom through a top opening (21) in said cylinder (24). A plastic, or like material, cap piece (23) with a lateral slit to allow removal of the pads (26) can be placed on the top opening (21) of the cylinder (24).

Referring to FIG. 1 through FIG. 5, the solid base tray (22) can be crafted of any suitable material and is not limited in size, shape or scope. It is preferred that the tray (22) have a vertical lip (25) around its peripheral edge to trap any deposited material and prevent overflow. The tray (22) and cylinder (24) can be constructed as a solid unit, or they can be separate detachable elements with a securing means. The tray (22) should be made of a lightweight, non-absorbent material that is also somewhat resistant to scratching or chewing damage by animals.

Figure 2:
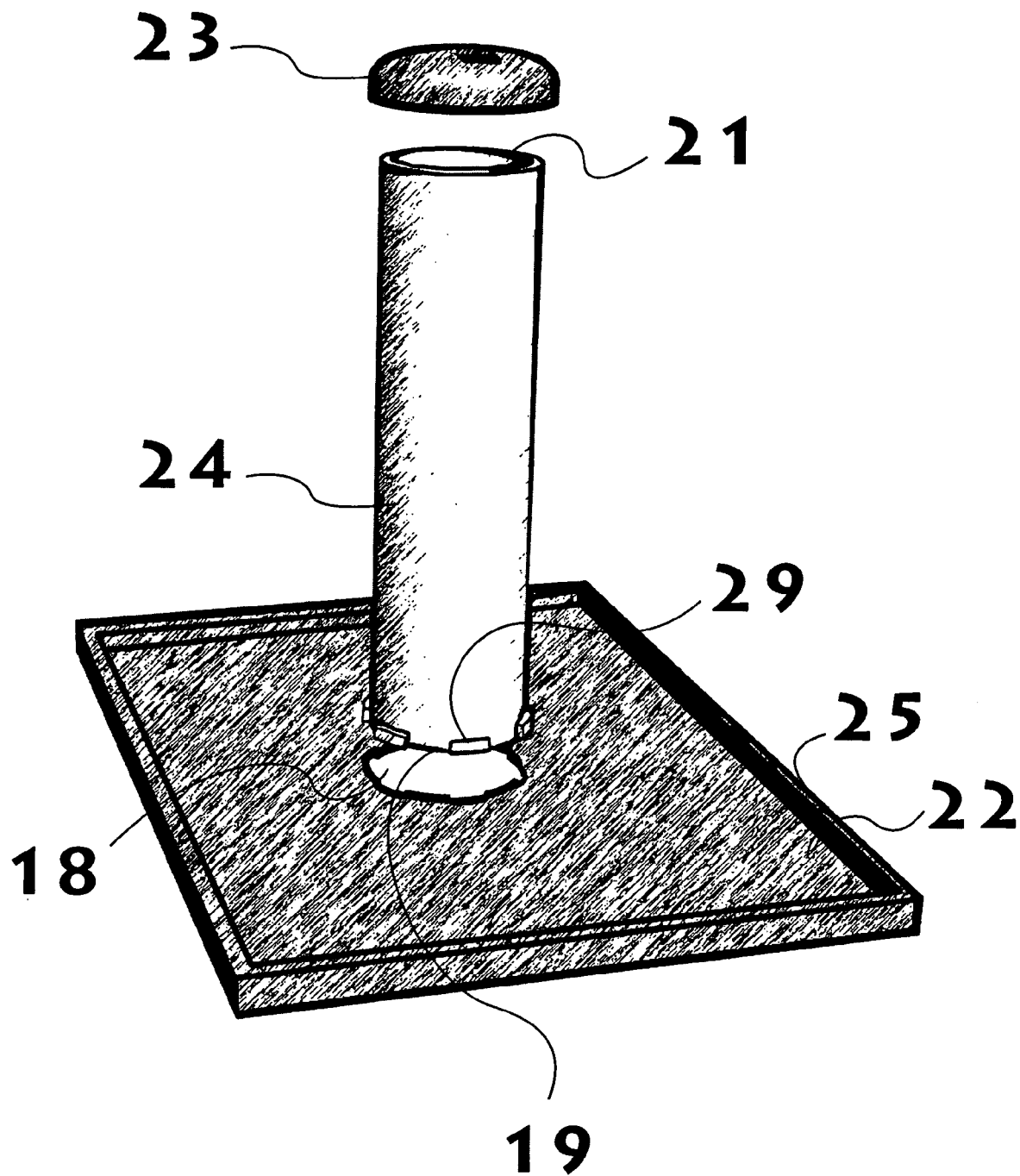
FIG. 2. illustrates the invention with the upright cylinder separated from the base tray and the cap piece separated from the upright cylinder.
Figure 4:
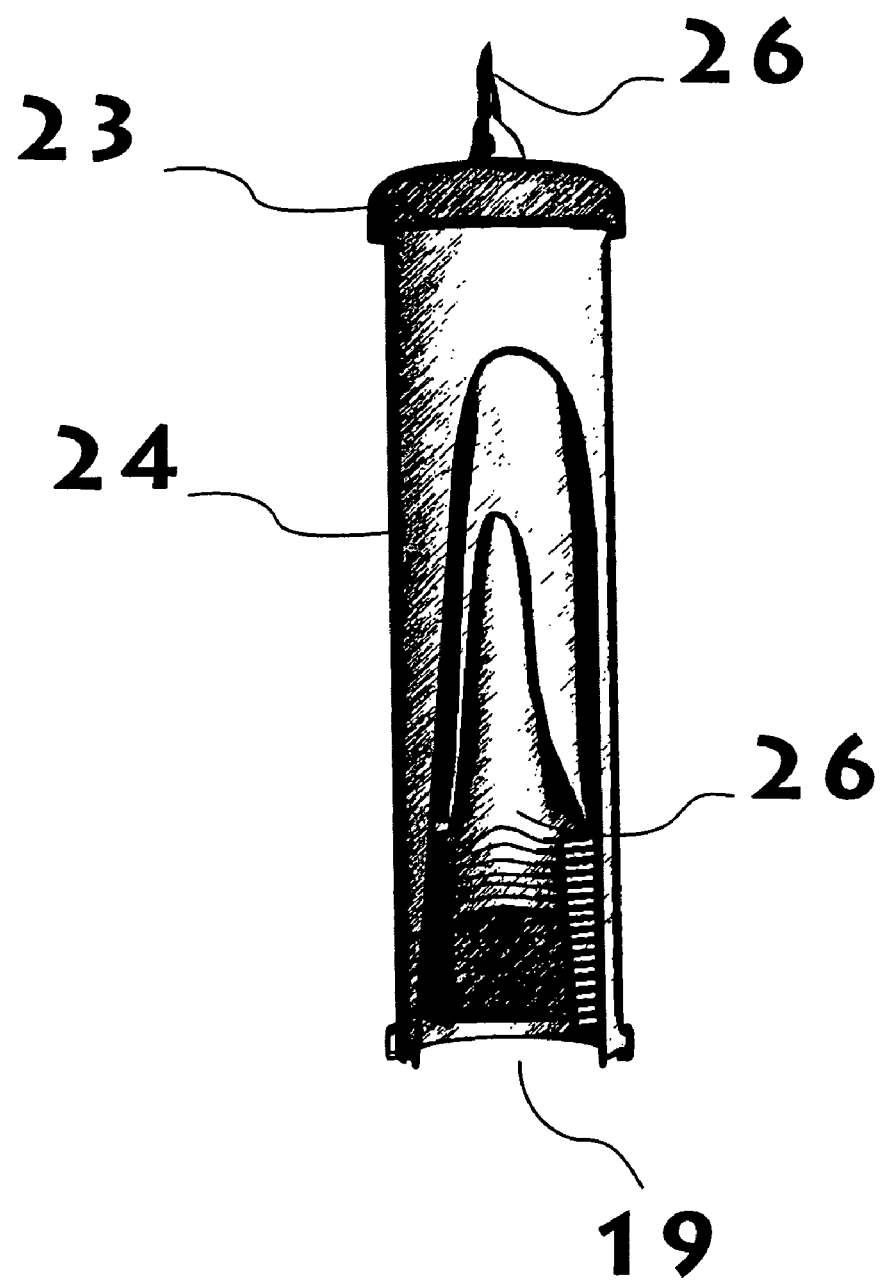
FIG. 4. Illustrates the invention with an exposure to the inside of the upright cylinder wherein the stack of absorbent pads can be viewed as contained within the upright cylinder.
Figure 5:
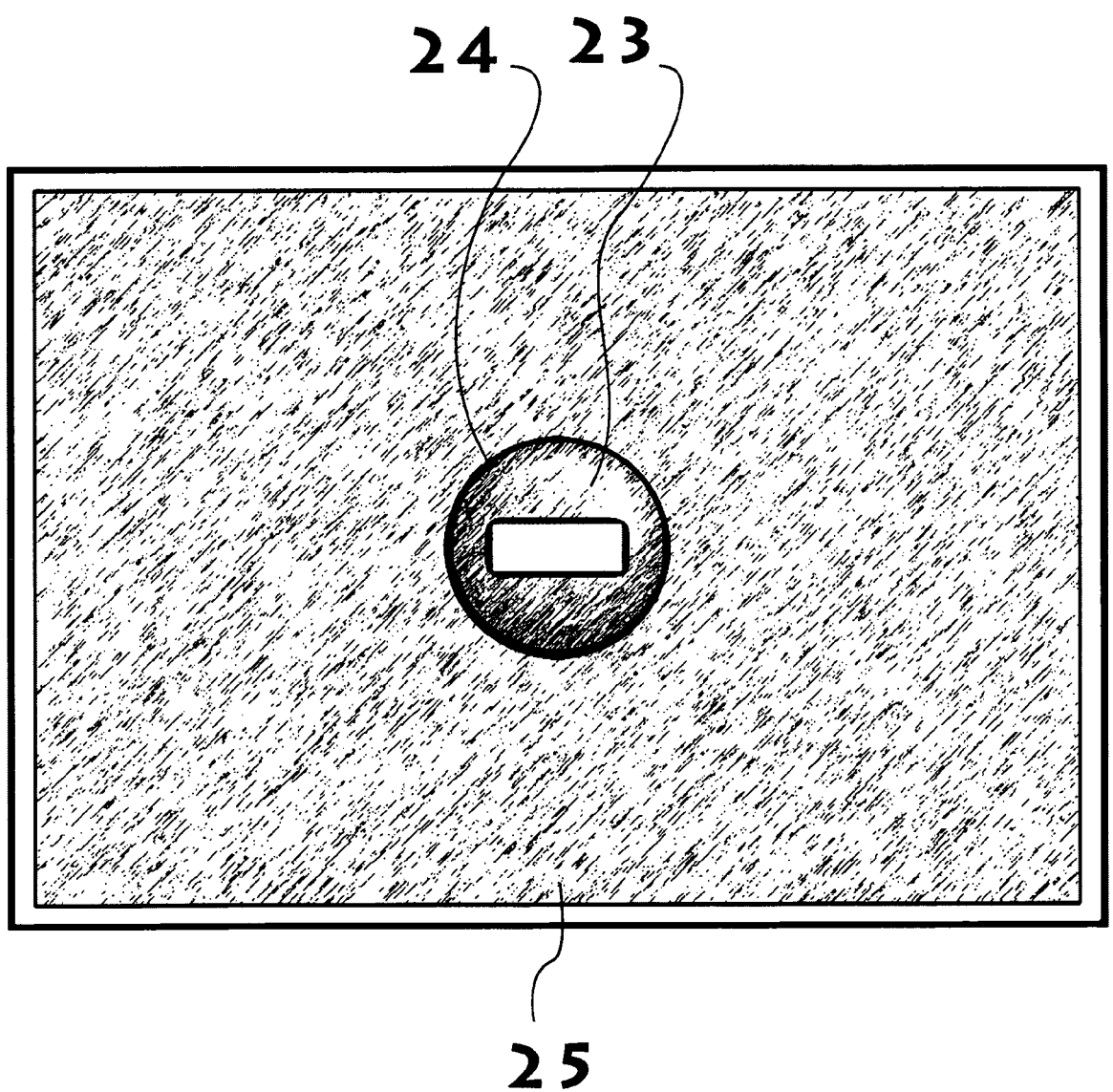
FIG. 5. Illustrates the invention as viewed from the bottom when the upright cylinder and base tray are a single unit with the bottom access opening or hole being in view.
Figure 6:
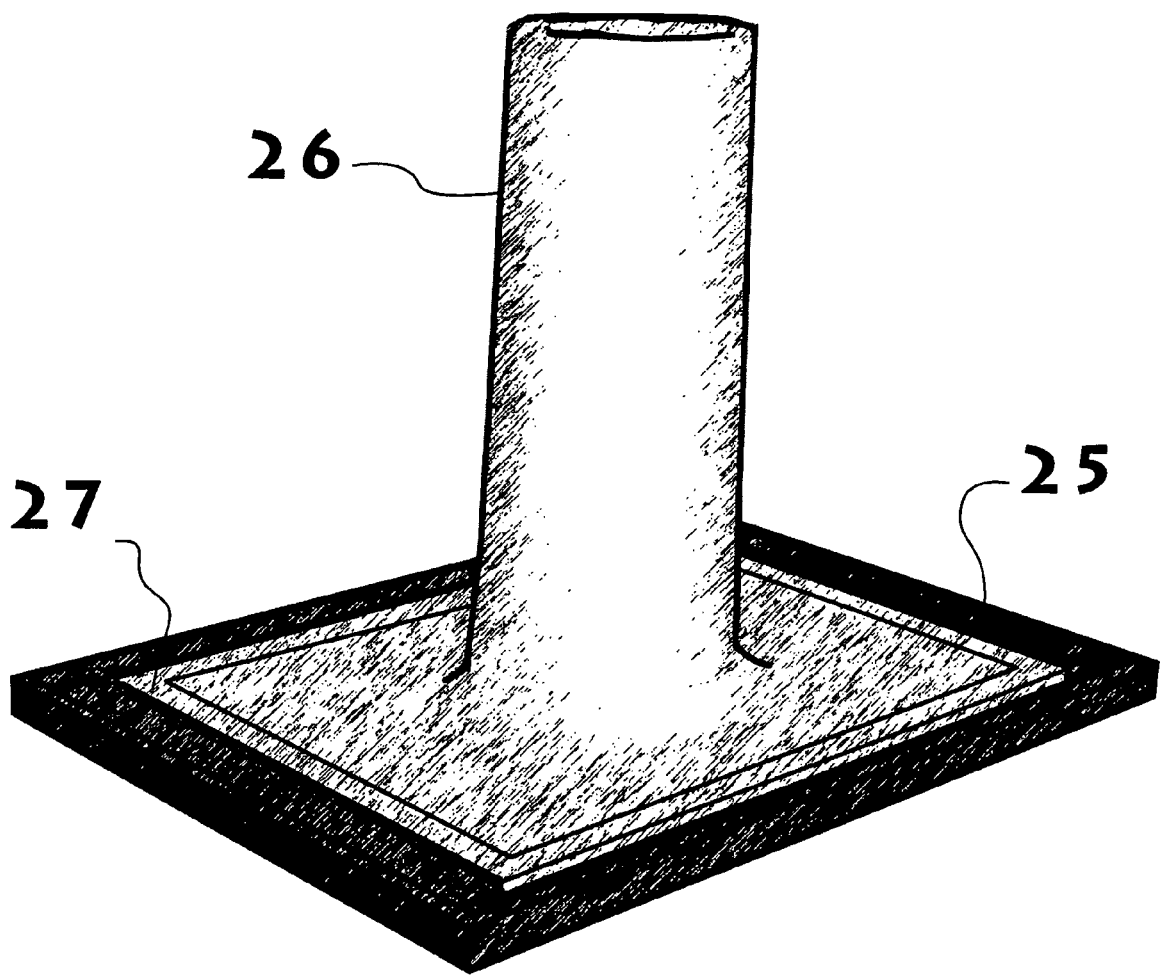
FIG. 6. Illustrates the invention with the absorbent pad being draped over the exterior of the upright cylinder and base tray.
Figure 7:
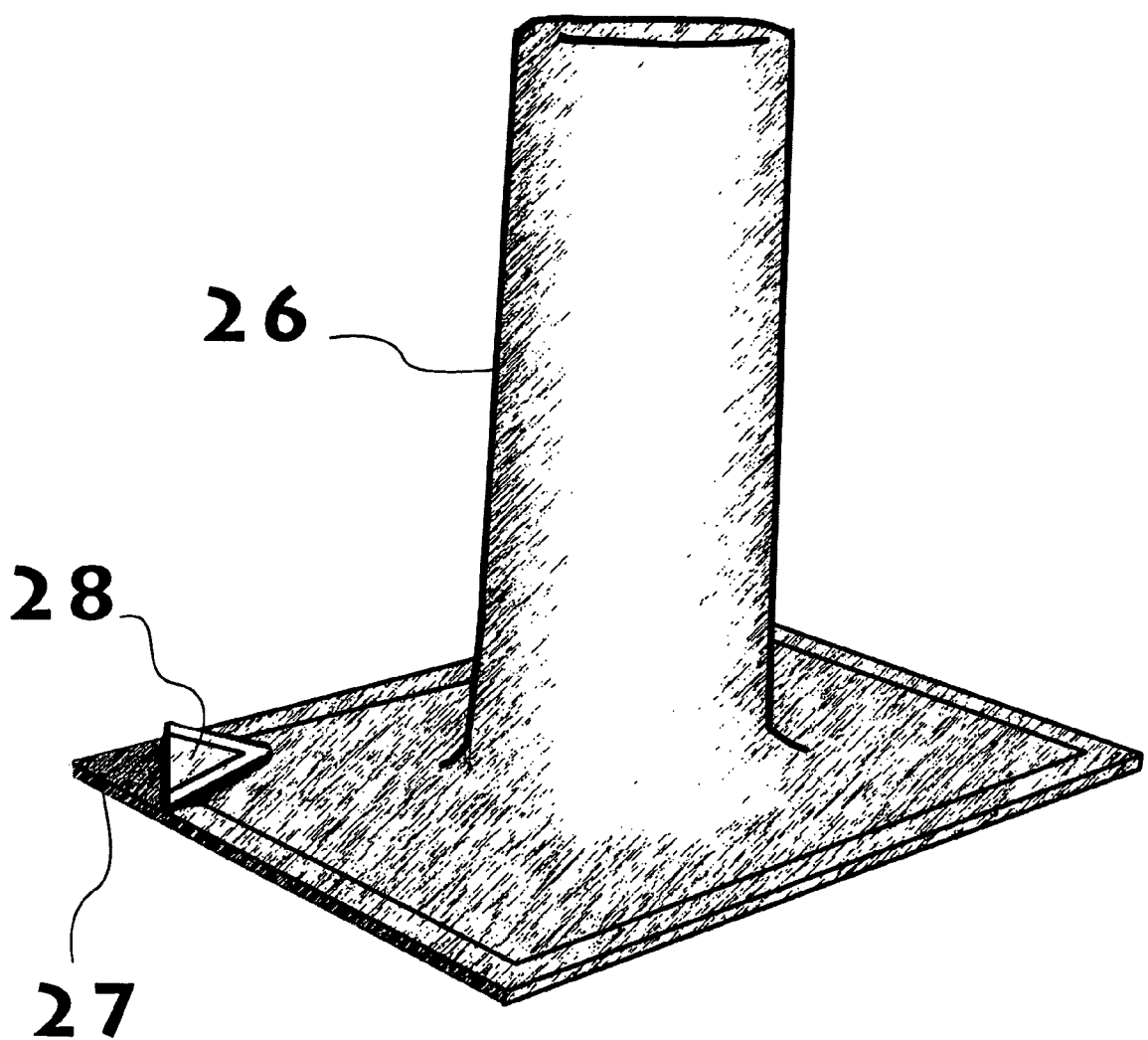
FIG. 7. Illustrates the invention with the absorbent pad only being in view and illustrates the layers of the absorbent pad.

Referring to FIG. 1, 2 and 4, the hollow cylinder (24) shall have a bottom opening (19) and a top opening (21). The cylinder (24) can be tapered upward to aid in retention of excess absorbent pads (26) when one pad is removed through the top opening (21). Preferably, the cylinder (24) and tray (22) will be crafted of the same or similar substance. The cylinder (24) and tray (22) are available in two separate embodiments, one in which they are detachable and one in which they are a solid unit.

Referring to FIG. 1 through 4, the pads (26) are an essential aspect of the apparatus and are contoured to completely cover the cylinder (24), and if desired, part of or all of the tray (22). The pads (26) can be stacked upon one another and placed within the cylinder (24) with the center of the pad corresponding with the center of the top opening (21) of the cylinder (24). The pads (26) should be crafted of an absorbent material such as cotton or foam for a top layer (28) and have a semipermeable to non-permeable bottom layer (27). Unlike similar pads already on the market, these pads (26) shall be contoured to fit the structure of this invention in a secure manner. If desired, the pads (26) can be manufactured to emit a pleasant odor, or an odor that would attract an animal to it for use. The size of the pad (26) shall correspond to the dimensions of the cylinder (24) and the tray (22) if the pad (26) is crafted to cover the tray (22) as well.

Figure 3:
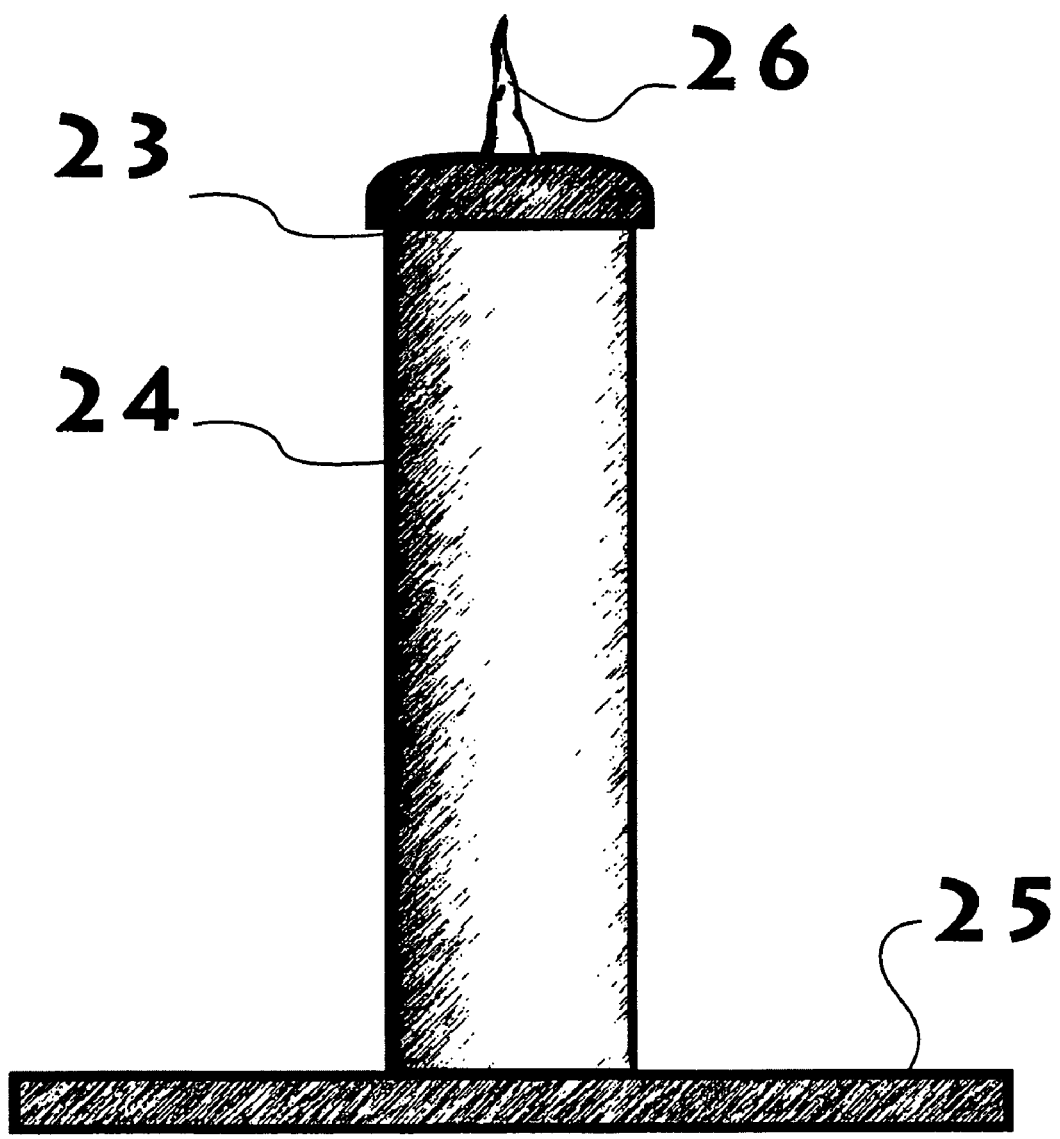
FIG. 3. illustrates the invention as a solid unit as viewed from a side angle with the absorbent pad held within the upright cylinder being slightly exposed through the hole in the cap piece.

Referring to FIG. 1 and 3 in particular, the apparatus can be crafted as a single unit, or with two primary components being the tray (22) and vertical cylinder (24). If the apparatus is crafted as a single unit, the bottom opening (19) for the cylinder (24) shall be on the bottom portion of the tray. This allows the user to place the pads (26) within the inner portion of the cylinder (24) and align the pads (26) with the top opening (21) of the cylinder (24). If the apparatus is crafted with the tray (22) and the cylinder (24) being separate, an attachment means should be utilized to connect the two portions. The attachment means can take any suitable form so long as it provides for the requisite security and durability. On such embodiment for the attachment means utilizes corresponding tabs (29) on the tray (22) and the cylinder (24). A recessed area (18) in the center of the tray which diameter is proportional to that of the cylinder (24) will have tabs (29) parallel to the tray's (22) surface which incrementally stick out around the peripheral edge of the circular, recessed area (18). The cylinder (24) will have a slightly smaller diameter at its base than its widest diameter at its bottom portion. Parallel corresponding tabs (29) at the base of the cylinder (24) surround its peripheral edge. The tabs (29) at the base of the cylinder (24) are twisted into place up under the tabs (29) on the tray (22). The diameter of the recessed opening in the tray (22) corresponds with the base of the cylinder (24) for a tight, secure fit that will prevent seepage of any liquid into the interior of the cylinder (24) and perhaps prematurely soiling the pads (26) contained therein. Other attachment means are available such as a threaded screw and nut type attachment.

Referring to FIG. 3, when the invention is in use the user will first place number or stack of pads (26) within the interior of the cylinder through the bottom opening (19), either when the apparatus is comprised of a single unit as seen in FIG. 2, or in a two part unit as seen in FIG. 1. The center of the pads (26) will correspond with the top opening (21). A single pad (26) will be removed by the user from the top opening (21) through the cap piece (23) and draped over the out portion of the cylinder (24) and above the tray (22). Due to the vertical nature of the cylinder, similar to a fire hydrant or bush, the animal is attracted to the location to urinate by natural instinct. The absorbent nature of the pad (26) will absorb the urine deposited by the animal. A capillary action within the absorbent material of the pad (26) will aid in dispersal of the urine so as not to allow for a concentration of said urine in one spot. Once the pad (26) has received a requisite amount of use, which will be decided by the user or owner of the pet, the pad (26) is removed and a new pad (26) is pulled through the top opening (21) in the vertical cylinder (24) as previously described.

DRAWINGS

The drawings referenced in this application are attached hereto.

I claim:

1. A method of using a pet urination device, comprising the steps of:

placing absorbent pads within an upright cylinder through a hole in the bottom of the upright cylinder, the center of the absorbent pads corresponding with the center of a hole in the upper portion of the upright cylinder;

attaching the upright cylinder to a base tray via securing means;

pulling the absorbent pad visible through the hole in the upper portion of the upright cylinder upward through the upright cylinder, removing it from the upright cylinder;

draping the absorbent pad over the upright cylinder and base tray; and removing the absorbent pad after the pet has urinated upon the absorbent pad.

2. A pet urination device comprising:

absorbent pads being custom fitted to the size of an upright cylinder and draping down upon a base tray with the absorbent pads being removed from within a hole in the top of the upright cylinder.

* * * * *